UNITED STATES PATENT OFFICE.

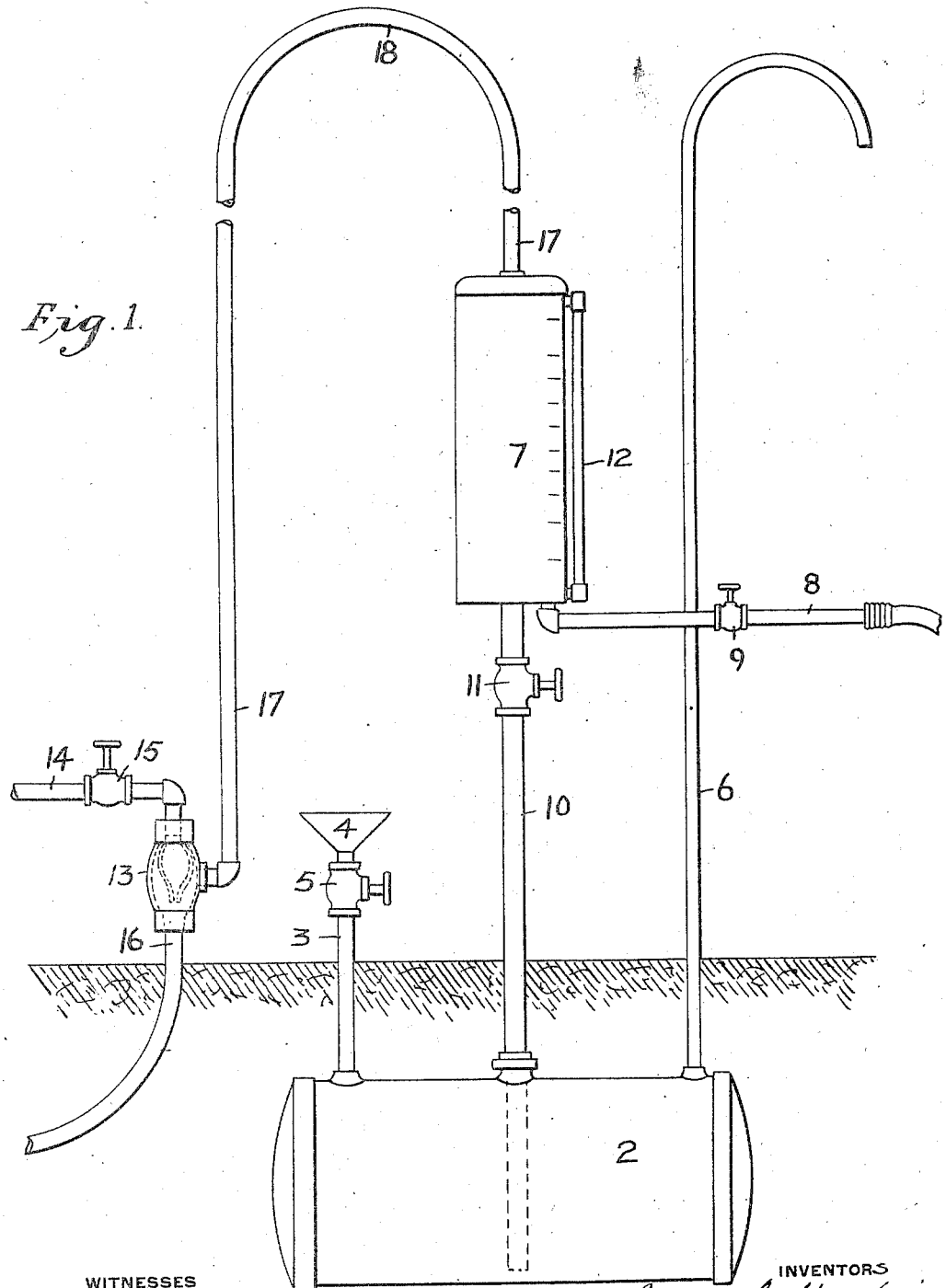

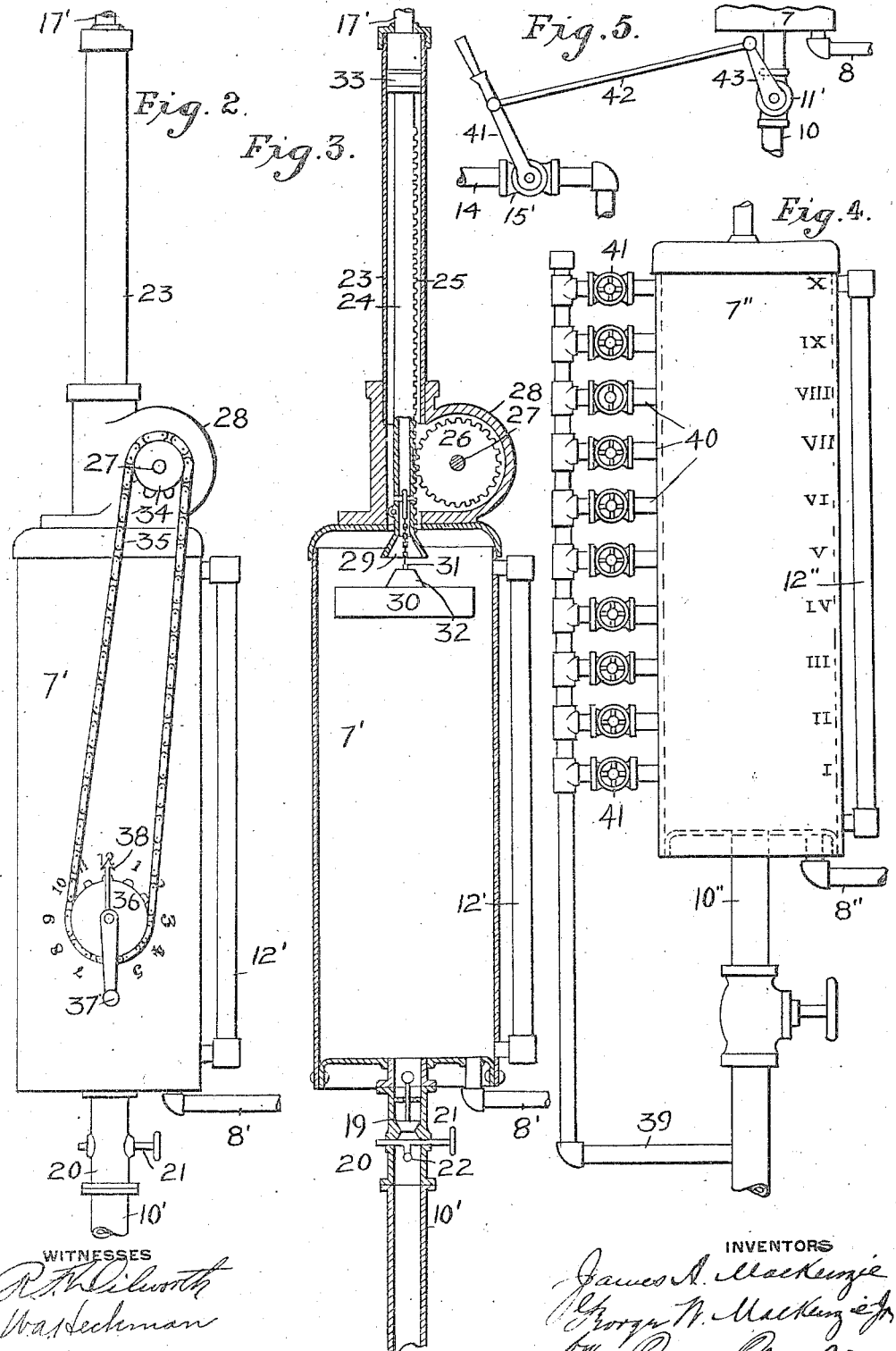

JAMES A. MacKENZIE AND GEORGE W. MacKENZIE, JR., OF BEN AVON, PENNSYLVANIA.

LIQUID-MEASURING APPARATUS.

1,228,363.

Specification of Letters Patent. Patented May 29, 1917.

Application filed September 14, 1914. Serial No. 861,547.

*To all whom it may concern:*

Be it known that we, JAMES A. MACKENZIE and GEORGE W. MACKENZIE, Jr, citizens of the United States, residing at Ben Avon, in the county of Allegheny and State of Pennsylvania, have invented certain new and useful Improvements in Liquid-Measuring Apparatus, of which the following is a specification.

Our invention relates to improvements in means for delivering liquids, preferably in measured quantities from a superimposed temporary or secondary measuring tank, connected with a main reservoir, and provided with means for exhausting air from the measuring tank to utilize atmospheric pressure whereby it is filled from the reservoir.

The invention includes means for producing flow of the fluid from a reservoir to a measuring tank, means for measuring the amount to be delivered therefrom within the measuring tank itself, means for delivering fluid from the measuring tank, and various other features of improvement as shall be more fully hereinafter set forth.

In the drawings,—

Figure 1 is a general view of one complete form of the apparatus in elevation, partly broken away.

Fig. 2 is a view of the secondary or measuring tank in elevation, showing a modified construction.

Fig. 3 is a vertical sectional view of the tank of the modified construction illustrated in Fig. 2, showing an adjustable sealing float and means for locating it at the desired position.

Fig. 4 is a view in elevation, similar to Fig. 2, showing a modified construction of secondary or measuring tank.

Fig. 5 is a detail view showing a connection between the injector valve and the secondary tank valve for operation of both valves together.

The apparatus is particularly designed for handling gasolene and the like, and to utilize a storage tank or reservoir 2 of a well-known construction, preferably underground, and to withdraw a portion of the contents as required, through a secondary or measuring tank. The primary tank 2 is provided with any suitable filling pipe 3 having a funnel 4 and shut off cock or valve 5.

A relief pipe 6 for admitting atmospheric air is connected with the upper portion of the tank 2 and may extend to any suitable point thereabove.

The secondary or measuring tank 7 is located at any suitable elevation above the primary tank for delivery by gravity through a pipe 8 having a controlling valve 9, and pipe 8 may have a terminal hose for convenience in charging any receiving vessel, as the tank of an automobile.

A pipe 10 leads from the bottom of tank 7 to the lower portion of tank 2, as indicated, so as to insure exhausting the contents thereof, and is provided with a valve 11.

Tank 7 is provided at one side with an indicating gage glass 12 whereby the height of the fluid may be seen, and suitable marks showing the capacity may be placed on the tank adjacent to the indicating gage, if desired.

For the purpose of creating a partial vacuum in tank 7, any suitable air exhausting means may be employed, but we prefer to use a siphon or injector 13 of suitable construction connected with any source of fluid pressure, as by pipe 14 having a controlling valve 15, connected to an ordinary water supply main or system, and having a waste pipe 16 leading to a sewer or suitable point of discharge.

A suction pipe 17 is connected with the upper end of tank 7, preferably by an upper extension 18 extending to a sufficient height to be beyond the range of the ultimate possible rise of the fluid upwardly above tank 7. Such extension should be theoretically about thirty-three feet, but for practical purposes may be considerably less, depending on the water pressure in line 14 and the air exhausting capacity of the injector 13.

The operation of the apparatus as above described is as follows: Valve 9 being closed and valve 11 opened, water is admitted to injector 13 by valve 15, creating a suction through pipe 17 and exhausting air from tank 7. Thereupon fluid will pass from main tank 2 through pipe 10, filling tank 7 to any desired extent, whereupon valve 11 is closed, as is also valve 15.

The fluid may then be drawn off from tank 7 by pipe 8, either entirely or partly, depending on the amount wanted. The remaining fluid may be retained in tank 7 and again withdrawn, or it may be returned to tank 2 by gravity on opening valve 11.

Where the tank 7 is used as a measuring tank as to its full content, or partly by use of the indicating marks, it may be entirely filled, or only to any predetermined height, within the control of the operator, through the circulation controlling valve 11 or valve 15; or the tank may be filled with a surplus and then lowered to the desired level, by draining off the surplus back to tank 2, and using the remainder.

For the purpose of providing means for filling the secondary tank to any desired or predetermined capacity, it may be constructed as shown in Figs. 2 and 3.

In such arrangement the secondary tank 7' is connected with the main tank 2 by pipe 10' as above described, but preferably through a check valve controlled passage having a gravity or pressure seating valve 19 in casing 20. A valve stem 21 is provided with a lifting finger 22 which is raised up underneath the valve 19, unseating it, to return any fluid to the main tank.

At the upper end of tank 7' a pipe 23 is connected at the top with the vacuum pipe 17', and within pipe 23 is a tube 24 having at one side a series of rack teeth 25. A toothed wheel 26 meshes into rack 25 and is mounted on rotatable stem or shaft 27 within a casing 28 on the top of the tank 7', through which casing the tube 24 extends downwardly into the tank itself.

The lower end of tube 24 is provided with a valve seat 29 and a float 30 depends from within the lower end of the tube by any suitable flexible or movable connection 31. Float 30 is provided with a co-acting valve 32, adapted to seat against the valve seat 29 and close it against passage of air, when the float is raised by the fluid rising in the tank 7'.

At its upper end, tube 24 is provided with an air tight plunger head or packing 33, confining air circulation to the inner opening through the tube.

The outer end of stem 27 is provided with a sprocket wheel 34 or the like geared by chain 35 or otherwise with a similar wheel 36, rotatably mounted on the side of the tank or in other convenient position. Wheel 36 or its shaft is provided with an operating handle 37 and also an indicating pointer 38, a series of indicating numerals being located in the range of the pointer circumferentially, each indicating the capacity of the tank, as in gallons, at proportionate heights of the sealing float, as elevated by operation of the sprocket and rack mechanism above described, and as finally elevated by flotation on the fluid to the point where the valve 32 is seated, as desired.

Upon the stem 24 and the valve carrying float being set for any desired measured amount of liquid, and the vacuum creating mechanism being set into action, liquid will flow up through pipe 10' until it reaches the float, whereupon valve 32 will seal the opening 29 and terminate the action. Thereupon check valve 19 will seat, and the measured contents may be drawn off through pipe 8', after closing the valve 15. Closing of said valve 15 terminates the vacuum-creating suction and reëstablishes normal atmospheric pressure within the measuring tank 7 through waste pipe 16 and suction pipe 17, permitting the liquid within the tank to be drawn off. If desired at any time, valve 19 may be raised by stem 21, returning any of the liquid to tank 2. Indicator glass 12' shows the height of the liquid within tank 7' at all times.

In Fig. 4 we show a further modification in which tank 7'' is of the construction first described, but supply pipe 10'' is provided with a by-pass pipe 39 having a series of branch connections 40 with the tank at successively higher levels, each connection corresponding in distance apart to any predetermined unit of measurement, as one gallon. These connections are each provided with a controlling valve 41, and it will be seen that by filling the tank up to any desired level, as indicated by the gage tube 12'' and the indicating marks I, II, etc., and then opening the particular valve 41 at the level corresponding to the amount desired to be measured in and withdrawn from the tank, any surplus above such level will be drawn off through that particular branch 40 and returned to the main tank, leaving the desired quantity. Such measured quantity may then be drawn off by pipe 8'' for use.

In Fig. 5 we show an arrangement for operating injector valve 15' and main supply valve 11' together by a single operating handle 41 secured to the stem of one of the valves and connected by rod 42 to the lever 43 of the other valve. By this means the suction from and supply to tank 7 may be simultaneously controlled.

The advantages of the invention reside in its facility for pumping any desired measured amount of liquid without the exercise of manual labor, and the substantially exact measurement of the amount to be withdrawn, without the necessity of retaining any surplus in the measuring tank.

The apparatus is comparatively simple and cheap in construction, very safe when used with combustible or explosive liquids, as gasolene, benzin, etc., and is equally capable of use with any other liquids as oil, liquor, vinegar, etc.

It may be variously changed in design, proportions, detail arrangement, or otherwise by the skilled mechanic, but all such changes are to be considered as within the scope of the following claims.

What we claim is:

1. In apparatus for delivering liquid in measured quantities, the combination of a main reservoir, a superimposed vessel connected therewith, an intervening controlling valve, an outlet conduit having a controlling valve, means for exhausting air from the superimposed vessel to effect its partial or entire filling from the main reservoir, said superimposed vessel being provided with an adjustable air suction conduit having a valve seat and a loosely attached float having a valve dependent on the rise of liquid in the vessel for effecting seating of said valve and terminating the outflow of air therefrom and resulting flow of liquid thereinto.

2. In apparatus for delivering liquid in measured quantities, the combination of a main reservoir, a superimposed vessel connected therewith, an intervening controlling valve, an outlet conduit having a controlling valve, means for exhausting air from the superimposed vessel to effect its partial or entire filling from the main reservoir, said superimposed vessel being provided with an adjustable air suction conduit having a valve seat and a loosely attached float having a valve dependent on the rise of liquid in the vessel for effecting seating of said valve and terminating the outflow of air therefrom and resulting flow of liquid thereinto.

3. In apparatus for delivering liquid in measured quantities, the combination of a main reservoir, a superimposed vessel connected therewith, an intervening controlling valve, an outlet conduit having a controlling valve, means for exhausting air from the superimposed vessel to effect its partial or entire filling from the main reservoir, said superimposed vessel being provided with an adjustable air suction conduit having a valve seat and a loosely attached float having a valve dependent on the rise of liquid in the vessel for effecting seating of said valve and terminating the out-flow of air therefrom and resulting flow of liquid thereinto and for indicating the contents of said vessel at the termination of such outflow and inflow respectively.

4. In apparatus for delivering liquid in measured quantities, the combination of a main reservoir, a superimposed measuring tank connected therewith having an outlet conduit, means for exhausting air from the measuring tank, a vertically movable hollow stem forming a conduit for the exhaust air and having a valve seat at its lower end, and a float having a valve adapted to seat therein to close said conduit by buoyant action of the liquid.

5. In apparatus for delivering liquid in measured quantities, the combination of a main reservoir, a superimposed measuring tank connected therewith having an outlet conduit, a check valve interposed between the measuring tank and the main reservoir, means for exhausting air from the measuring tank, a vertically movable hollow stem forming a conduit for the exhaust air and having a valve seat at its lower end, and a float having a valve adapted to seat therein to close said conduit by buoyant action of the liquid.

6. In apparatus for delivering liquid in measured quantities, the combination of a main reservoir, a superimposed measuring tank connected therewith having an outlet conduit, means for exhausting air from the measuring tank, a vertically movable hollow stem forming a conduit for the exhaust air and having a valve seat at its lower end, a float having a valve adapted to seat therein to close said conduit by buoyant action of the liquid, and means for adjusting said conduit to varying heights.

7. In apparatus for delivering liquid in measured quantities, the combination of a main reservoir, a superimposed measuring tank connected therewith having an outlet conduit, means for exhausting air from the measuring tank, a vertically movable hollow stem forming a conduit for the exhaust air and having a valve seat at its lower end, a float having a valve adapted to seat therein to close said conduit by buoyant action of the liquid, rack and pinion mechanism for adjusting said conduit to varying heights, and actuating mechanism therefor provided with a fluid content indicator.

8. In combination with a main reservoir and air exhausting mechanism, a measuring tank having a pipe leading to the reservoir and provided with a check valve and unseating mechanism therefor, a vertically movable hollow stem forming a conduit for exhaust air and having a rack and a valve seat, a float loosely connected to the conduit having a valve adapted to engage said valve seat to close the conduit by buoyant action of the liquid, a pinion engaging the conduit rack, and means for actuating said pinion geared with an indicating device.

In testimony whereof we hereunto affix our signatures in the presence of two witnesses.

JAMES A. MacKENZIE.
GEORGE W. MacKENZIE, Jr.

Witnesses:
C. M. CLARKE,
FREDK. STAUB.